(12) United States Patent
Schneider et al.

(10) Patent No.: US 8,950,507 B2
(45) Date of Patent: Feb. 10, 2015

(54) DEVICE FOR PREVENTING VIBRATIONS IN A TOOL SPINDLE

(75) Inventors: Kurt Schneider, Bellmund (CH); Jeremie Monnin, Nidau (CH); Edwin Reinhard, Niederonz (CH)

(73) Assignee: Step-Tec AG, Luterbach (CH)

( * ) Notice: Subject to any disclaimer, the term of this patent is extended or adjusted under 35 U.S.C. 154(b) by 221 days.

(21) Appl. No.: 13/059,768

(22) PCT Filed: Aug. 6, 2009

(86) PCT No.: PCT/EP2009/060172
§ 371 (c)(1), (2), (4) Date: Apr. 19, 2011

(87) PCT Pub. No.: WO2010/020543
PCT Pub. Date: Feb. 25, 2010

(65) Prior Publication Data
US 2011/0186323 A1 Aug. 4, 2011

(30) Foreign Application Priority Data
Aug. 21, 2008 (EP) .................................. 08105090

(51) Int. Cl.
| | |
|---|---|
| *E21B 44/00* | (2006.01) |
| *B23Q 1/70* | (2006.01) |
| *B23Q 1/34* | (2006.01) |
| *B23Q 11/00* | (2006.01) |
| *B24B 41/04* | (2006.01) |

(52) U.S. Cl.
CPC .. *B23Q 1/70* (2013.01); *B23Q 1/34* (2013.01); *B23Q 11/0032* (2013.01); *B24B 41/042* (2013.01)

USPC .............................................. 173/1; 173/162.1

(58) Field of Classification Search
CPC .................................. E21B 19/08; E21B 21/01
USPC ............ 173/1, 162.1, 162.2; 82/173, 152, 47, 82/118; 73/462, 593, 597
See application file for complete search history.

(56) References Cited

U.S. PATENT DOCUMENTS

| | | | | |
|---|---|---|---|---|
| 3,045,510 | A | * | 7/1962 | Brainard ............................. 408/3 |
| 3,548,172 | A | * | 12/1970 | Idelsohn et al. ............... 318/561 |
| 3,634,664 | A | * | 1/1972 | Valek ............................. 318/561 |
| 3,675,517 | A | * | 7/1972 | Tadayoshi ........................ 82/118 |
| 3,686,956 | A | * | 8/1972 | Simpkin et al. .................. 73/462 |
| 4,047,469 | A | * | 9/1977 | Sakata ........................... 409/132 |
| 4,250,555 | A | * | 2/1981 | Mitchell et al. ................ 702/105 |

(Continued)

FOREIGN PATENT DOCUMENTS

| | | | |
|---|---|---|---|
| CH | 653590 | | 1/1986 |
| CH | 653590 AS | * | 1/1986 |

(Continued)

*Primary Examiner* — Andrew M Tecco
*Assistant Examiner* — Nathaniel Chukwurah
(74) *Attorney, Agent, or Firm* — Bachman & LaPointe, P.C.

(57) ABSTRACT

A device and a method for preventing vibrations (19) in a rotating spindle (1) mounted in at least one front 8 and one rear bearing (9) in a machine tool, wherein the device comprises measuring units (2, 3, 4, 5) for detecting the vibrations (19) and correction device (6) for preventing the vibrations (19) disposed directly about the periphery (10, 11) of the spindle (1) in a contacting or non-contacting manner and that a control unit (7) for processing the measuring units (2, 3, 4, 5) and for calculating the correction values for the correction device (6) is assigned to this device.

11 Claims, 3 Drawing Sheets

(56) References Cited

U.S. PATENT DOCUMENTS

| | | | | |
|---|---|---|---|---|
| 4,346,444 | A | * | 8/1982 | Schneider et al. ............ 700/173 |
| 4,464,935 | A | * | 8/1984 | McHugh ......................... 73/660 |
| 4,559,600 | A | * | 12/1985 | Rao ............................... 700/175 |
| 5,369,348 | A | * | 11/1994 | Gennesseaux ................ 318/623 |
| 5,494,427 | A | * | 2/1996 | Arai .............................. 425/145 |
| 5,608,153 | A | * | 3/1997 | Ueyanagi ...................... 73/1.38 |
| 5,672,092 | A | | 9/1997 | Berberich |
| 5,779,405 | A | * | 7/1998 | Aiso et al. .................... 409/132 |
| 7,175,374 | B2 | * | 2/2007 | Takaku ......................... 409/194 |
| 7,530,878 | B2 | | 5/2009 | Simakov et al. |
| 7,546,787 | B2 | | 6/2009 | Hackh et al. |
| 2002/0046607 | A1 | * | 4/2002 | Hagiwara ...................... 73/593 |
| 2002/0078790 | A1 | * | 6/2002 | Trionfetti .................... 74/573 F |
| 2002/0108444 | A1 | * | 8/2002 | Matsuoka ....................... 73/593 |
| 2005/0196090 | A1 | * | 9/2005 | Maeda et al. ................. 384/624 |
| 2006/0036351 | A1 | * | 2/2006 | Hopkins ....................... 700/280 |

FOREIGN PATENT DOCUMENTS

| | | |
|---|---|---|
| DE | 19531506 | 2/1997 |
| DE | 10344293 | 4/2005 |
| EP | 1175960 | 1/2002 |
| EP | 1882548 | 1/2008 |

* cited by examiner

DEVICE FOR PREVENTING VIBRATIONS IN A TOOL SPINDLE

BACKGROUND OF THE INVENTION

The invention relates to a device and a method for reducing vibrations of a rotating spindle mounted in at least one front and one rear bearing in a machine tool.

In the case of machine tools, particularly high-frequency milling machines, high accuracies are required. Frequently, these accuracies are affected by the mounting of the spindle, the design, wear, overload etc. of the individual components connected thereto.

In DE 103 44 293 A1, a grinding machine has a machine device that, by means of a suitable measuring device, determines the wobble motion of a workpiece to be machined. The grinding tools are made to track the wobbling workpiece in such a way that the workpiece is machined true to size and in a concentric manner.

EP 1 882 548 A1 discloses a machine tool in which a dynamic spindle adjustment, which allows an adjusting motion to compensate a lateral run-out of the body held by the spindle, is provided on the spindle mounting.

Proceeding from this prior art, it is the object of the invention to propose a device and a method that improves the unwanted vibrations of the rotating spindle in that, in particular, the accuracy of the depth of cut, of the width of cut, of the spindle rotational speed etc. is controlled such that an optimal accuracy of the tool to be machined is achieved.

SUMMARY OF THE INVENTION

The object is achieved according to the invention in that the device has measuring devices for sensing the vibrations and correction means for reducing the vibrations, which are disposed about the periphery of the spindle in a directly contacting or a non-contacting manner, and in that a control unit for processing the measuring devices and for calculating the correction values for the correction means (6) is assigned to this device.

Furthermore, the object is achieved by a method that, for the purpose of reducing the vibrations of the rotating spindle, the measurement values of the measuring devices are first sensed by the control unit, and the correction values calculated from the measurement values are forwarded in real time to the correction devices, which bring the spindle into the desired, almost vibration-free position.

Serving as measuring devices are, for example, at least one non-contacting position transducer, at least one acceleration pick-up, at least one strain gauge and/or at least one angle transducer.

Preferably, a triaxially measuring acceleration sensor can be inserted in the spindle as an acceleration pick-up. Such a three-dimensional acceleration is a triaxially measuring acceleration sensor for measuring oscillations and vibrations, having a voltage output. The acceleration sensor measures simultaneously the three spatial components x, y, z of the acting acceleration.

At least one piezoelectric element and/or electrorheological devices can be provided as correction devices.

BRIEF DESCRIPTION OF THE DRAWINGS

The invention is represented, as an exemplary embodiment, in the drawing, wherein.

DETAILED DESCRIPTION

Figure 1:
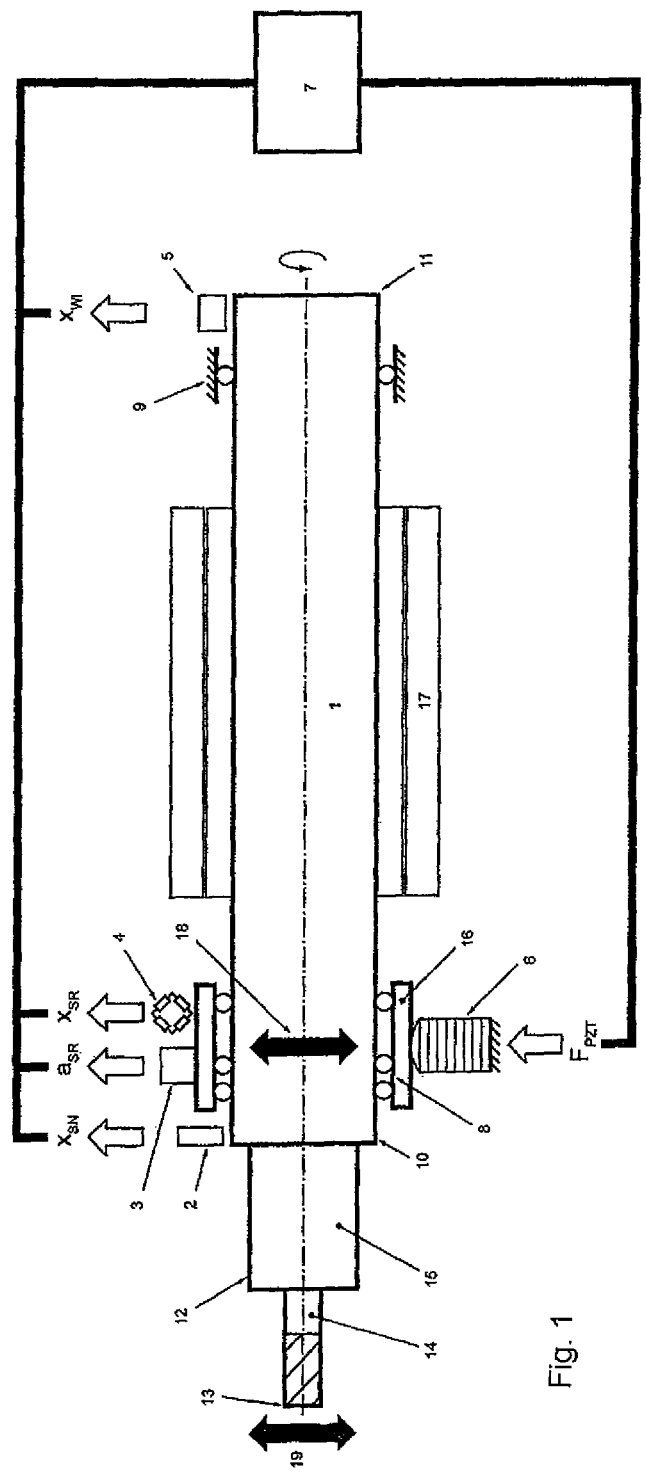
FIG. 1 shows a longitudinal section
Figure 2:
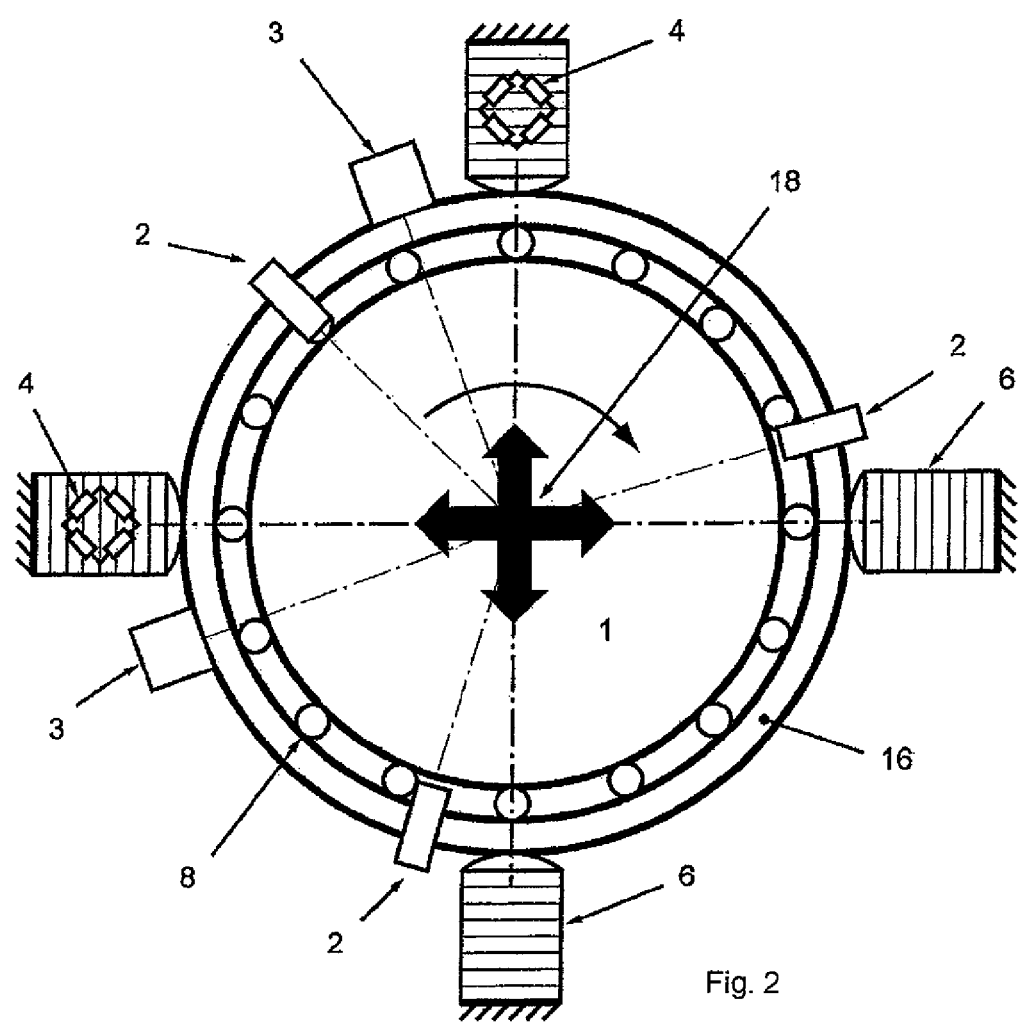
FIG. 2 shows a cross-section of the device

FIG. 1 (longitudinal section) and FIG. 2 (cross-section) show a spindle 1, which is rotatably mounted to rotate about a spindle axis in a front bearing 8 and in a rear bearing 9. Clamped in at one end of the spindle 1 is a tool holder 15 with the tool 14. Located at the end of the tool is the tool tip 13. The spindle (1) is driven to rotate about the spindle axis by the motor 17.

The unwanted vibrations 19 at the tool tip 13, between the tool 14 and the workpiece, which is not represented, are generated substantially by the rotation of the spindle about the spindle axis by, for example, imbalance due to design, by cutting forces, instability and/or resonance effects. Depending on the spindle and the process, these effects usually occur at 200 to 5000 Hz. For this, an acceleration pick-up 3 is used for measurement. The acceleration pick-up 3 supplies the measurement signal $a_{SR}$.

Further deviations can occur because of kinematic errors, such as eccentricities, thermal influences and static loads. Effects in the frequency range of less than 500 Hz dependent on the spindle. These effects are sensed by the strain gauge 4 with the measurement signal $x_{SR}$ and/or by the combination of the non-contacting position transducer 2 with the measurement signal $x_{SN}$ and of the angle transducer 5 with the measurement signal $x_{WT}$.

Likewise, a tool breakage, an overload, wobble motions and/or the dynamics of cutting forces can be monitored by means of the acceleration pick-up 3 and/or the strain gauges 4 and/or the position transducers 2 via the signals $a_{SR}$, $x_{SR}$, $x_{SN}$ and $x_{WT}$.

The measuring devices, such as position transducer 2, acceleration pick-up 3 and the strain gauges 4 are fitted either to the spindle periphery 10 that is directed towards the tool side or on the sliding ring 16 of the front bearing 8. As can be seen from FIG. 2, the two strain gauges 4 are disposed at right angles to one another on the sliding ring 16 of the front bearing 8.

In FIG. 1, the angle transducer 5 is located at the spindle periphery 11 opposite the tool side 12.

The measurement values $x_{SN}$, $a_{SR}$, $x_{SR}$, $x_{WT}$ are input to the control unit 7 via lines. In the control unit, the measured data is processed and a correction signal $F_{PZT}$ is generated. The correction signal $F_{PZT}$ goes via a line to the piezoelectric elements 6, which then, by means of the sliding ring 16, trigger a correcting counter-motion 18 of the front bearing 8 perpendicularly to the spindle axis.

Figure 3:
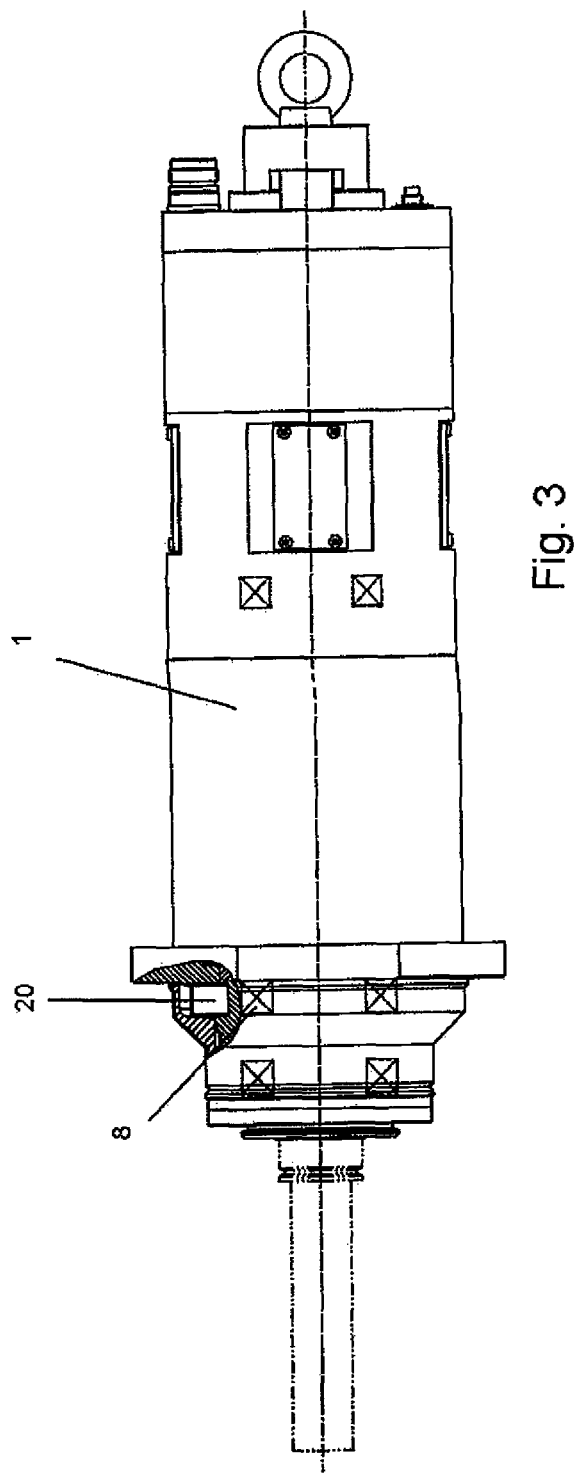
FIG. 3 shows the arrangement of a triaxially measuring acceleration sensor

FIG. 3 shows a spindle 1 in longitudinal section. Disposed on the front bearing 8 is a triaxially measuring acceleration sensor, which senses the vibrations in all three spatial components x, y, z simultaneously.

The advantages associated with the invention consist, in particular, in that the device and the method create an optimal solution that reduces the unwanted vibrations of the rotating spindle, deviations resulting from thermal effects or overloads and, moreover, allows monitoring of the process parameters during the machining of a workpiece.

The invention claimed is:

1. In a machine having a rotating spindle (1) adapted to receive a machining tool, the spindle is mounted in at least one front bearing (8) and one rear bearing (9) for rotation about a spindle axis, a device for reducing vibrations (19) of the spindle (1) comprises vibration measuring devices (2, 3, 4, 5) for sensing the vibrations (19) and vibration reducing correction device (6) for reducing the vibrations (19), a control unit (7) for processing the vibration measuring devices (2, 3, 4, 5) and for calculating correction values for the vibration reducing correction device (6) for triggering a correcting counter-motion (18) perpendicularly to the spindle axis wherein the vibration measuring devices and the vibration reducing correction device are disposed about a periphery (10, 11) of the spindle and proximate to one of the at least one front bearing and at least one rear bearing in either a contacting or non-contacting manner.

2. The device as claimed in claim 1, wherein the vibration measuring devices (2, 3, 4, 5) are selected from the group consisting of at least one non-contacting position transducer (2), at least one acceleration pick-up (3), at least one strain gauge (4), at least one angle transducer (5) and combinations thereof.

3. The device as claimed in claim 2, wherein the vibration reducing correction device (6) is selected from the group consisting of at least one piezoelectric element (6), electrorheological devices, and mixtures thereof.

4. The device as claimed in claim 3, wherein at least two piezoelectric elements (6), for reducing the vibrations (19), are disposed at right angles to one another at the outer periphery of the front bearing (8) of the spindle (1).

5. The device as claimed in claim 2, wherein at least one acceleration pick-up (3) is disposed at an outer periphery of the front bearing (8) of the spindle (1).

6. The device as claimed in claim 5, wherein the acceleration pick-up (3) comprises a triaxially measuring acceleration sensor.

7. The device as claimed in claim 2, wherein at least two strain gauges (4) are disposed at right angles to one another at the outer periphery of the front bearing (10) of the spindle (1).

8. The device as claimed in claim 2, wherein a non-contacting angle transducer (5) is disposed at the spindle periphery that is directed contrary to the tool side (12).

9. The method as claimed in claim 2, wherein, for the purpose of reducing the vibrations (19) of the rotating spindle, the measurement values ($x_{SN}$, $a_{SR}$, $x_{SR}$, $x_{WT}$) of a position transducer (2), of an acceleration pick-up (3), of the two strain gauges (4) and of an angle transducer (5) are input to the control unit (7), and the correction values calculated from the measurement values ($x_{SN}$, $a_{SR}$, $x_{SR}$, $x_{WT}$) are forwarded in real time to the piezoelectric elements, for bringing the spindle (1) into the desired position by means of a correction force ($F_{PZT}$).

10. The device as claimed in claim 1, wherein a non-contacting position transducer (2) is disposed at the spindle periphery (10) that is directed towards a side of a machining tool (12).

11. A method for reducing vibrations of a spindle in a machine having a rotating spindle (1) adapted to receive a machining tool, the spindle is mounted in at least one front bearing (8) and one rear bearing (9) for rotation about a spindle axis, a device for reducing vibrations (19) of the spindle (1) comprises vibration measuring devices (2, 3, 4, 5) for sensing the vibrations (19) and vibration reducing correction device (6) for reducing the vibrations (19), a control unit (7) for processing the vibration measuring devices (2, 3, 4, 5) and for calculating the correction values for the vibration reducing correction device (6) for triggering a correcting counter-motion (18) perpendicularly to the spindle axis wherein the vibration measuring devices and the vibration reducing correction device are disposed about the periphery (10, 11) of the spindle and proximate to at least one of the bearings in either a contacting or non-contacting manner, the method comprising the steps of:

wherein, for the purpose of reducing the vibrations (19) of the rotating spindle, (a) sensing by the control unit measurement values ($x_{SN}$, $a_{SR}$, $x_{SR}$, $x_{WT}$) of the vibration measuring devices (2, 3, 4, 5); (b) calculating correction values from the measurement values ($x_{SN}$, $a_{SR}$, $x_{SR}$, $x_{WT}$); and (c) forwarding in real time the correction values to the vibration reducing correction devices (6) for bringing the spindle (1) into the desired, substantially vibration-free position.

* * * * *